United States Patent [19] [11] 3,992,694
Ehrlich [45] Nov. 16, 1976

[54] TRANSDUCER WITH HALF-SECTION ACTIVE ELEMENT

[75] Inventor: Stanley L. Ehrlich, Middletown, R.I.

[73] Assignee: Raytheon Company, Lexington, Mass.

[22] Filed: Feb. 20, 1975

[21] Appl. No.: 551,569

[52] U.S. Cl. .................................. 340/10; 310/9.7; 340/17 R

[51] Int. Cl.[2] .......................................... H04B 13/00

[58] Field of Search .................... 340/8 R, 9, 10, 11, 340/12 R, 13 R, 14, 17; 310/9.7, 9.8, 8.7

[56] References Cited

UNITED STATES PATENTS

| | | | |
|---|---|---|---|
| 3,230,503 | 1/1966 | Elliot, Jr. et al. | 340/10 |
| 3,284,761 | 11/1966 | Douglas | 340/10 |
| 3,337,843 | 8/1967 | Kendig et al. | 340/9 |
| 3,460,061 | 8/1969 | Massa | 340/10 |
| 3,474,403 | 10/1969 | Massa et al. | 340/10 |
| 3,716,828 | 2/1973 | Massa | 340/10 |

*Primary Examiner*—Harold Tudor
*Attorney, Agent, or Firm*—David M. Warren; Joseph D. Pannone; Milton D. Bartlett

[57] ABSTRACT

A transducer composed of a plurality of transducer segments arranged along a line with electrodes positioned between the segments and a pair of end electrodes positioned at opposite ends of the line of transducer segments. The two end electrodes are electrically coupled. Alternate ones of the remaining electrodes are coupled to the terminal pair of a signal generator which electrically activates the transducer segments to convert the electrical signals to vibrational energy for the radiation of sonic energy from the transducer. This arrangement reduces the electrical potential between the electrodes and a metallic case which encloses the transducer.

5 Claims, 2 Drawing Figures

TRANSDUCER WITH HALF-SECTION ACTIVE ELEMENT

BACKGROUND OF THE INVENTION

This invention relates to sonar transducers and, more particularly, to an arrangement of transducer segments and electrodes for reducing the electrical potential between the electrodes and a case which encloses the transducer.

Sonar transducers utilized in ensonifying water with high-powered sonic energy are often built by an array of piezoelectric ceramic transducer segments with electrodes positioned therebetween for energizing the ceramic segments with a relatively high voltage electrical signal. The magnitude of the exciting voltage is often limited by the physical structure of the transducer assembly, particularly the relative positions between the electrodes which are bonded to the transducer segments and a metallic case which is typically utilized in enclosing the transducer segments. In some physical configurations of the transducer assembly, the danger of arcing between the transducer electrodes and the case present an upper limit on the sound power which can be radiated by the transducer assembly.

SUMMARY OF THE INVENTION

The aforementioned problems are overcome and other advantages are provided by a transducer which, in accordance with the invention, is composed of a plurality of transducer segments which are positioned end-to-end along a line in an arrangement wherein electrodes are positioned between the transducer segments and in electrical contact therewith for impressing an electrical signal voltage across the transducer segments for converting electrical energy into vibrational energy. In addition, a pair of outer electrodes are affixed respectively to the front end of the first segment in the line arrangement and to the back end of the last segment in the line arrangement. The two outer electrodes are electrically coupled. In a preferred embodiment of the invention, the transducer segments are of tubular shape and are positioned along a common axis with the first and last transducer segments having a length, as measured along the axis, which is equal to one-half the length of the other transducer segments. This reduction in length equalizes the electric field intensity of the end segments with the electric field intensity of the other segments. By energizing the transducer from a signal generator having a balanced output, such as a push-pull amplifier, the end electrodes have a potential of approximately zero relative to ground while the potential of the other electrodes relative to ground is one-half the potential between the terminals of the signal generator. A transducer assembly comprising a metallic case plus metallic masses at both ends of the transducer as is customary in the design of transducer assemblies is thus found to have a maximum electrical potential between any point in the transducer and the case of the transducer assembly which is no more than one-half the potential between the terminals of the signal generator.

BRIEF DESCRIPTION OF THE DRAWING

The aforementioned features and other aspects of the invention are explained in the following description taken in connection with the accompanying drawings wherein.

DESCRIPTION OF THE PREFERRED EMBODIMENT

Figure 1:
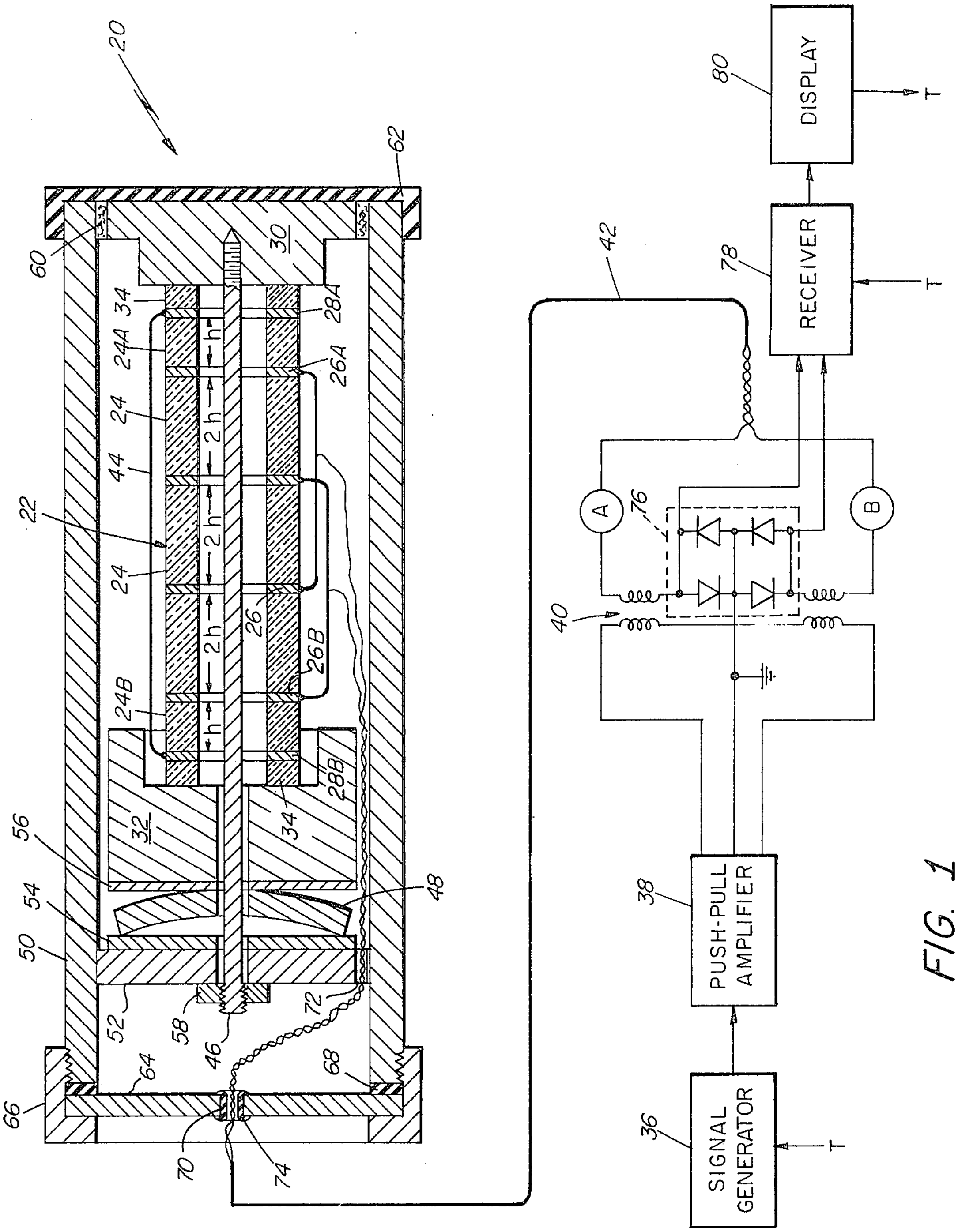
FIG. 1 shows an axial sectional view of a transducer assembly including a series of transducer segments, there being an odd number of segments electrically connected in accordance with the invention.

Referring now to FIG. 1, there is seen a transducer assembly 20 incorporating a transducer 22 which, in accordance with the invention, comprises a plurality of transducer segments 24, some of which will be further identified by the suffixes A and B, positioned end-to-end with electrodes 26, some of which will be further identified by the suffixes A and B, positioned between the transducer segments 24, contiguous thereto, and in electrical contact therewith. In this embodiment of the invention, each of the transducer segments 24 has a tubular shape and the inner electrodes 26 are in the forms of rings affixed by bonding to the adjacent transducer segments 24. The transducer segments 24 are positioned along a common axis and have a length of $2h$ as measured along the axis, the front and back transducer segments 24A–B of the arrangement each having a length, $h$. Outer electrodes 28–B are bonded respectively to the transducer segments 24A–B at the front and back ends of the transducer 22. The transducer assembly 20 further comprises a front plate 30 by which sound is radiated outwardly into the surrounding medium and a rear mass 32 which are set in vibration by the transducer 22 and are mechanically coupled thereto by ceramic rings 34 which serve as electrical insulators for insulating the front plate 30 and the rear mass 32 from the electrical signals on the outer electrodes 28A and 28B.

Electrical signals for energizing the transducer 22 are provided by a signal generator 36, a push-pull amplifier 38 and a center tapped transformer 40 having output terminals A and B which are coupled by a twisted pair of wires 42 to the transducer 22. Alternate ones of the inner electrodes 26 are coupled to terminal A of the transformer 40 while the remaining ones of the inner electrodes 26 are coupled to terminal B of the transformer 40. The push-pull amplifier 38 serves to amplify signals of the signal generator 36 to a suitable magnitude of power for driving the transducer 22. The transformer 40 serves to match the impedance of the transducer 22 to that of the amplifier 38. In particular, it is noted that the output terminals of the transformer 40 are balanced with respect to a grounded center tap of the output winding such that the terminals A and B experience equal and opposite values of signal voltage as measured with respect to ground.

In accordance with the invention, the two outer electrodes 28A–B are electrically coupled by a wire 44, the electric potential appearing on wire 44 being approximately half the difference of potential between adjacent ones of the inner electrodes 26 or, equivalently, half the difference of potential between the output terminals A and B of the transformer 40. Thus, the potential of the wire 44 relative to ground is approximately zero. And the potential of any one of the inner electrodes 26 relative to ground or relative to the front plate 30 and the rear mass 32 is only one-half the difference of potential between neighboring ones of the inner electrodes 26. This greatly reduces a chance of arcing between the inner electrodes 26 and some other part of the transducer assembly 20 such as the front plate 30 and the rear mass 32.

The transducer assembly 20 also comprises a tie rod 46, a disk spring 48, a cylindrical case 50 having a transverse member 52, a washer positioned between the spring 48 and the member 52 to protect the member 52 from the spring 48, a washer 56 positioned between the spring 48 and the rear mass 32 to protect the rear mass 32 from the spring 48, and a nut 58 which is threadedly secured to the tie rod 46. The tie rod 46 is threadedly secured in the front plate 30 and thereby, upon tightening of the nut 58 against the member 52, urges the front plate 30 towards the member 52 to compress the spring 48 and prestress the transducer 22. The front plate 30 is centered along the axis of the case 50 by a ring 60 of a pressure release or vibration isolation material such as paper. A rubber boot 62 is bonded to the front face of the transducer assembly 20 to prevent the entry of water to its interior. A cover 64 is secured to the back end of the case 50 by a threaded retainer ring 66 and a waterproof grommet 68 which is tightly secured between the cover 64 and the back end of the case 50 by a tightening of the retainer ring 66. The twisted pair of wires 42 passes through an aperture 70 in the cover 64 and an aperture 72 in the member 52 so that each of the wires of the pair of wires 42 can be secured to respective ones of the inner terminals 26. A grommet 74 is provided in the aperture 70 to prevent the entry of water through the aperture 70 to the interior of the transducer assembly 20.

As shown in the embodiment of FIG. 1, an odd number of transducer segments 24 are utilized. The inner electrode 26A is at the forward end of the transducer 22 and the inner electrode 26B is at the back end of the transducer 22. The aforementioned use of the odd number of transducer segments 24 provides for opposite polarity of voltage between the inner terminals 26A and 26B so that an electric field is directed from the electrode 26A to the electrode 28A and from the electrode 28B to the electrode 26B.

The transducer assembly 20 may be utilized in sonar applications wherein the transducer assembly 20 is mounted on the hull of a ship traveling in the ocean or towed by a cable behind the ship for the transmission of sonic energy into the ocean and the reception of echoes reflected from objects in the ocean. The transducer 22 may be energized with a higher voltage than that customarily utilized since only one-half the voltage appears between inner electrodes 26 and the case 50. A T/R circuit 76 composed of four diodes in a balanced configuration about the center tap of the output winding of the transformer 40 is provided for coupling signals received by the transducer assembly 20 to a receiver 78 which amplifies these signals and presents them to a diaplay 80. A timing signal, T, provided by the display 80 is applied to the signal generator 36 and the receiver 78 for synchronizing their operation to enable the transducer assembly 20 to be utilized in making ocean ranging measurements.

Figure 2:
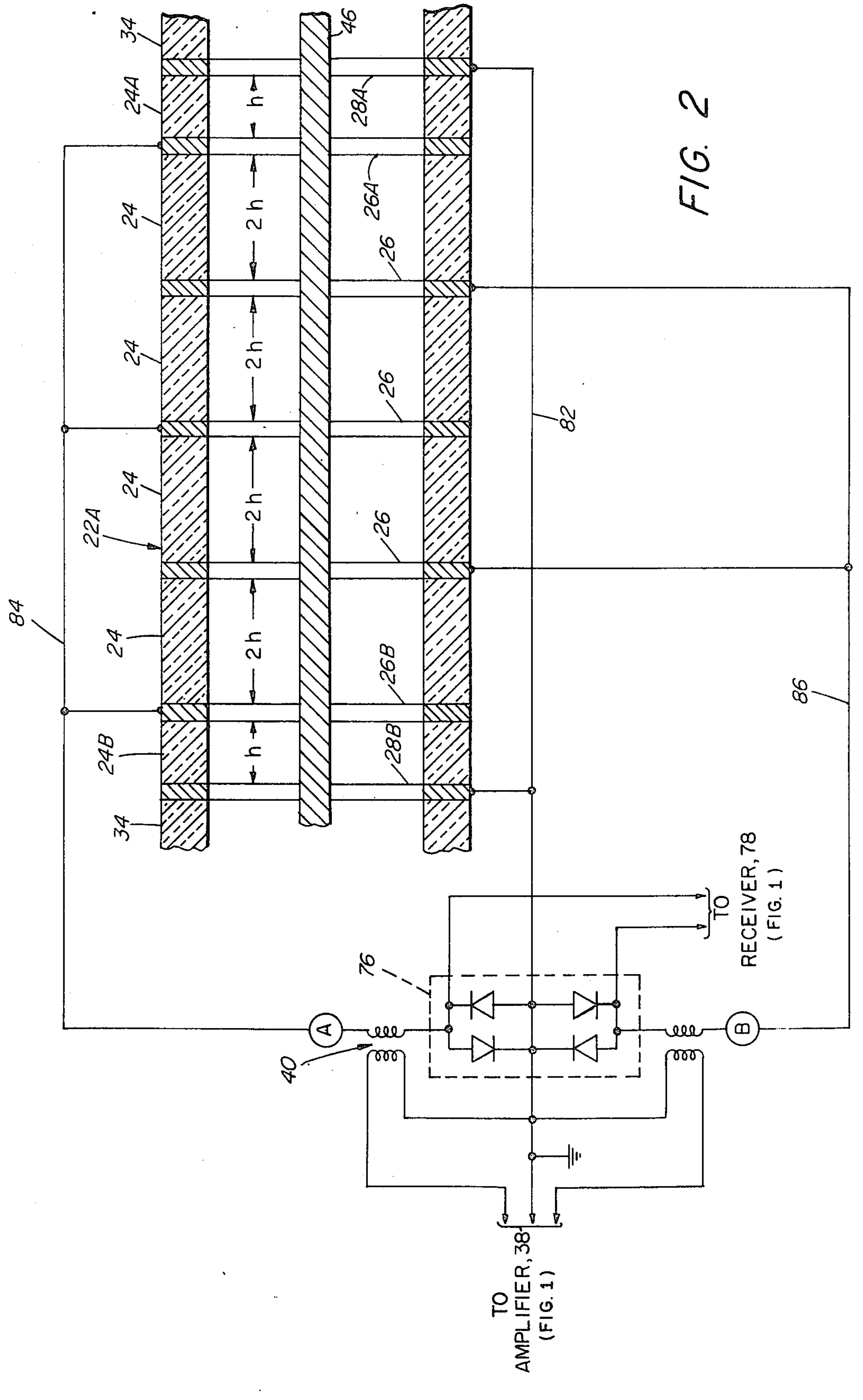
FIG. 2 is partial view of the assembly of FIG. 1 in which the assembly has been modified to accommodate an even number of segments.

Referring now to FIG. 2, there is seen a sectional view of a portion of a transducer assembly similar to that of FIG. 1, but herein modified to utilize an alternative transducer identified by the legend 22A and having an even number of transducer segments 24. In the alternative embodiment of FIG. 2, the outer electrodes 28A–B are electrically coupled via a wire 82 to each other and to the ground terminal of the transformer 40. Alternate ones of the inner electrodes 26 are electrically coupled to terminal A of the transformer 40 by wire 84 with the remaining ones of the inner electrodes 26 being electrically coupled to terminal B of the transformer 40 by wire 86. In both the embodiments of FIGS. 1 and 2 the front and back transducer segments 24A–B are preferably given a length, $h$, which is one-half the length, $2h$, of the other transducer segments 24 to equalize the electric field intensity within the front and back transducer segments 24A–B with that of the other transducer segments 24.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A transducer for providing a conversion between electric energy and acoustic energy comprising:

an array of transducer segments, each of said segments having a first end and a second end thereof opposite said first end;

a plurality of electrodes, the number of electrodes being one more than the number of said transducer segments in said array;

said transducer segments being arranged end-to-end along a line, one of said electrodes being positioned between each pair of said transducer segments contiguous thereto and in electrical contact therewith, one of said electrodes of said plurality of electrodes being positioned at a first end of said array in contact with a first end of a first one of said transducer segments of said array, another electrode of said plurality of electrodes positioned at a second end of said array in contact with a second end of a last transducer segment of said array of transducer segments; and means for electrically coupling said electrode positioned at said first end of said first transducer segment to said electrode positioned at said second end of said last transducer segment, said electrode positioned at said first end of said first transducer segment and said electrode positioned at said second end of said last transducer segment being electrically insulated from the remaining ones of said plurality of electrodes, alternate ones of the remaining ones of said plurality of electrodes being connected by electrical conductors attached thereto whereby electrical signals can be coupled between said alternate ones of said electrodes for energizing said transducer.

2. A transducer according to claim 1 wherein said first transducer segment of said array and said last transducer segment of said array each have a length as measured between its first end and its second end which is equal to one-half the length of the other ones of said transducer segments of said array whereby the electric field intensity in said first transducer segment is equal to the electric field intensity in the other ones of said transducer segments, and whereby the difference of potential between the terminal of said first transducer segment and of said second transducer segment are each equal to one-half the difference of potential between the termini of the other ones of said transducer segments.

3. A transducer according to claim 2 wherein each of said transducer segments has a tubular form and wherein each of said electrodes has the form of a ring, said transducer segments and said rings being positioned so that the axes of said transducer segments and the axes of said rings coincide.

4. A transducer according to claim 3 further comprising a front plate positioned at one end of said array and coaxial thereto, a rear mass positioned at the opposite end of said array and coaxial thereto, tie rod means urging said front plate towards said rear mass to prestress said transducer segments of said array, and first and second electrical insulators positioned respectively between said front plate and the electrode positioned at the end of said first transducer segment and between said rear mass and the electrode positioned at the end of said last transducer segment, each of said electrical insulators having the shape of a ring and being mounted coaxial to said array and being formed of a sound-propagating material.

5. A transducer circuit comprising:

an array of transducer segments arranged end-to-end and having electrical terminals coupled therebetween;

a transformer winding having first and second terminals thereof and a center tapped terminal thereof coupled to a reference potential, said first and said second terminals thereof being coupled to alternate ones of a plurality of said transducer segment terminals;

first and second end transducer segments coupled to first and second ends of said array; and means for electrically coupling said first and said second end transducer segments to provide a difference of potential across said first end transducer segment equal in magnitude to the difference of potential between said first terminal of said transformer winding and said center tapped terminal of said transformer winding.

* * * * *

UNITED STATES PATENT OFFICE

CERTIFICATE OF CORRECTION

Patent No. 3,992,694 Dated November 16, 1976

Inventor(s) Stanley L. Ehrlich

It is certified that error appears in the above-identified patent and that said Letters Patent are hereby corrected as shown below:

Column 2 line 16, add "inner" between with and electrodes -;

Column 2, line 28, add "A" after 28 -;

Column 3, line 6, add "54" between washer and positioned -;

Column 4, line 63, changes "terminal" to "termini" -;

Signed and Sealed this

Eighth Day of March 1977

[SEAL]

*Attest:*

RUTH C. MASON
*Attesting Officer*

C. MARSHALL DANN
*Commissioner of Patents and Trademarks*